May 19, 1936. H. G. SMITH 2,040,960

VALVE SPRING KEY

Filed March 1, 1935

Inventor
Harry G. Smith
By Blackmore, Spencer & Flint
Attorneys

Patented May 19, 1936

2,040,960

UNITED STATES PATENT OFFICE 2,040,960

VALVE SPRING KEY

Harry G. Smith, Flint, Mich., assignor to General Motors Corporation, Detroit, Mich., a corporation of Delaware Application March 1, 1935, Serial No. 8,835

4 Claims. (Cl. 251—144)

This invention relates to an improvement in valve stem collars or spring retainers for seating the spring which closes a poppet valve, and is especially adapted for use in an overhead valve assembly of an internal combustion engine.

In the conventional overhead valve engine, each valve has its stem inserted in a guide bushing from the underside of the head, and the end of the stem carries a detachable washer against which a coiled compression spring bears to seat the valve. The washer usually comprises a number of separate parts which are held together by the elastic force of the valve spring. Fortunately, valve springs have a fairly long life but occasionally one breaks and then in the absence of pressure the washer parts may fall apart and allow the valve stem to slip down in its guide. Obviously, a valve dropping into the engine cylinder may cause considerable damage between the relatively moving parts, but even though no injury occurs considerable delay and expense is involved in replacing the valve and its associated parts. Some manufacturers go to the extra expense of using an additional spring, which affords a measure of safety in that should either spring break the other is effective until substitution is made.

To eliminate the precautionary use of double spring, but more particularly to prevent separation of the spring retainer parts in the event of spring breakage and, therefore, keep the valve from falling out of its guide, is the primary object of the present invention. To this end there is contemplated as a simple and inexpensive expedient, an interlock between the retainer parts, of a spring detent type, which will facilitate easy and quick assembly or removal and which when applied will be free from the active force of the valve spring or if the valve is not active, will effectually resist accidental separation.

Figure 1:
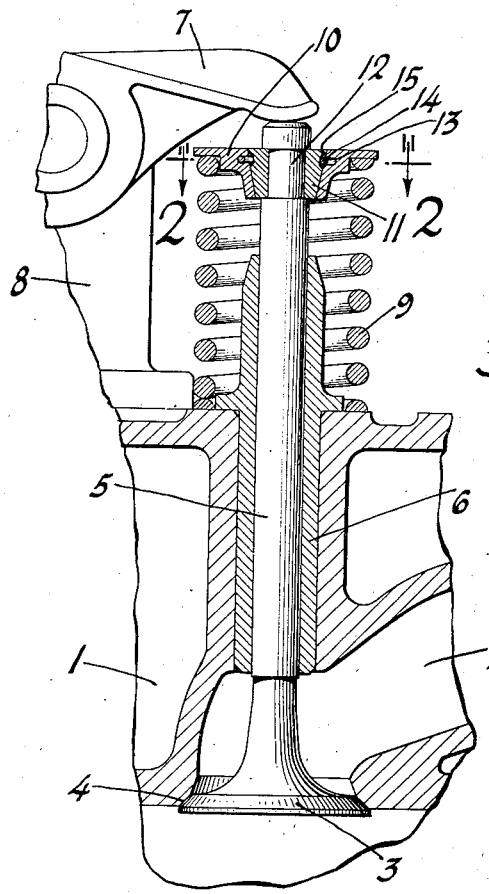
Figure 2:
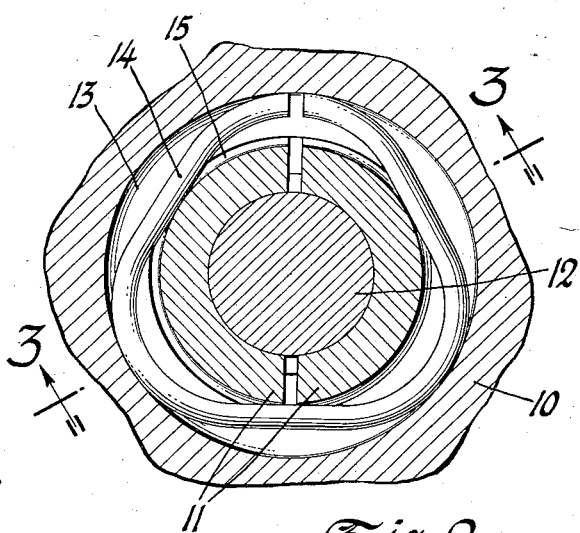
Figure 3:
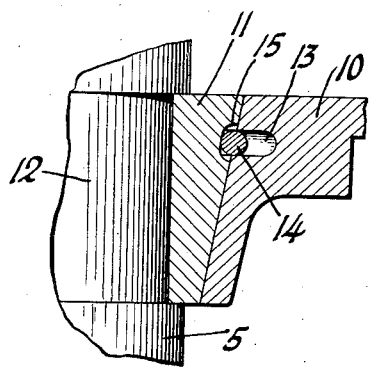
Figure 4:
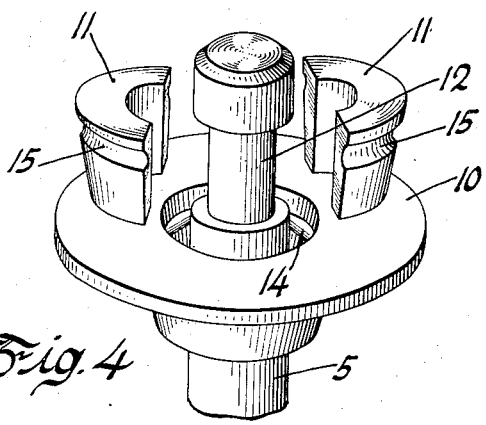

For a better understanding of the invention reference may be had to the accompanying drawing, illustrating a preferred embodiment, and in which Figure 1 is a vertical sectional view through a fragment of an overhead valve assembly; Figure 2 shows on a larger scale a section taken on line 2—2 of Figure 1; Figure 3 is a sectional view on line 3—3 of Figure 2, and Figure 4 is a detail perspective view of the retainer parts prior to assembly.

In the drawing a water cooled cylinder head is indicated at 1 in which is located a port or passageway 2 for communication with the engine cylinder. Communication is controlledd by a poppet valve 3 seating at 4 and having a stem 5 extending upwardly through an opening in the cylinder head and being guided in a bearing sleeve or bushing 6. At its upper end the stem 5 is engaged by a rocker arm 7 supported by suitable standards 8 and actuated by any well known mechanism in timed relation with the reciprocatory engine piston. The rocker arm 7 opens the valve against the force of the coil spring 9 bearing at one end against the engine cylinder head or other fixed seat and at its opposite end against a retainer removably associated with the end of the valve stem 5.

The retainer shown in the drawing is of the wedge type and involves a collar or disc 10 having a tapered opening which receives a split conical key 11 embracing and fitting within a reduced or shouldered portion 12 of the stem 5. The spring 9 bearing on the collar 10, by reason of the inclined bearing surfaces, wedges the sections of the split key 11 inwardly and, in cooperation with the shoulders of the reduced portion 12, retains the parts in operative position.

Formed on the inside of the collar 10 is a radially elongated annular groove or recess 13 which receives and carries as a unit therewith, a spring detent 14 for projection into an annular groove 15 formed in the key 11 in alinement with the groove 13. For convenience, the spring detent 14 is in the nature of a split wire ring of substantially triangular shape. The portions forming the several angles are preferably curved and fit closely against the outermost wall of the groove 13, while the sides of straight line portions project inwardly of the outside wall of the groove and beyond the tapered surface at the opening through the collar, so as to lie within the groove 15 of the key 11. The groove 13 thus provides sufficient clearance to accommodate expansion of the detent 14 when it is to be snapped into or out of its grooved seat in the key upon relative axial movement of the key and collar. The seat or groove 15 is shown in the drawing as being elongated axially so that it is considerably wider than the spring wire detent whereby the load of the valve spring acting on the collar is taken entirely by the tapered key through the cooperating wedge surfaces.

In assembling the parts the valve stem 5 is inserted through its guide 6 from the underside of the head 1 and the valve spring 9 with the collar 10 placed in position, is compressed. The split key 11 is then positioned within the groove 12 and the spring 9 is released to push the collar over the key and hold the spring retainer parts in place. As the collar and key move together the inwardly projecting portions of the spring wire 14 will be pressed outwardly in the groove 13 by engagement with the inclined surface of the key until these portions drop into the groove 15. Upon disassembly the snap spring will be carried along with the collar during relative movement and will be caused to ride out of its groove or seat 15. However, in the absence of some positive force to move the parts the detent 14 will maintain its engagement within the groove 15 and thus retain the collar and key together and on the valve stem so that the stem is held against sliding through the bearing sleeve or bushing 6.

From the above description it will be apparent that there is provided a structure which will enable broken valve springs to be easily and quickly replaced and which in the meantime will hold the valve parts against displacement.

I claim:

1. In combination with a poppet valve having a stem and a compression spring action through the stem to seat the valve, of a collar seating the spring and having a tapered opening therein, a tapered split key seating on the stem within said opening, and a snap spring retainer fitting alined recesses in the collar and key, the recess in the key being axially elongated for a loose fit of the retainer and having its outer wall nearer the outer end of the assembled key and collar than the outer wall of the recess in the collar to prevent force of the valve spring being exerted on the retainer and the recess in the collar being radially elongated for accommodating expansion of the retainer when cammed outwardly by the key upon relative axial movement of the key and collar.

2. In an engine valve organization, wherein a poppet valve seats under influence of a spring acting on the valve stem, a valve spring seat adapted for detachable engagement with the valve stem, said seat including a tapered stem engaging key provided on its tapered outer surface with an axially elongated groove, a spring engaging collar having a tapered inner surface for wedging engagement with the key, and in said surface a radially elongated groove for alinement with the groove in the key, and a spring wire permanently carried within the radially elongated groove of the collar with a portion of less width than the width of said axially elongated groove projected out of the groove beyond the tapered inner surface for snap engagement into and out of the axially elongated groove of the key upon relative movement of the collar and key for a loose fit within and in axially spaced relation with the outer end of said axially elongated groove.

3. In an overhead valve engine a poppet valve having a stem, a valve spring, and a valve spring retainer including a washer surounding the valve stem and forming a seat for the valve spring, and having a conical opening therein, a pair of oppositely disposed keys embracing the valve stem and having conical peripheral surfaces seated in the conical opening of the washer, and a snap spring retainer permanently carried by the washer and loosely fitted within an axially elongated circular groove in said keys and in axially spaced relation to the outer end of said groove to lock said keys and washer against accidental disengagement.

4. A valve spring seat, including a tapered split key, a tapered collar wedgedly engaging the key, and a snap spring carried within a groove in the collar and projected into an alined and axially elongated groove in the key to retain the parts against accidental separation, there being clearance in the groove in the collar to receive the projected portion of the spring when the same is snapped out of the groove in the key and axial clearance in the groove of the key toward the outer end thereof to avoid axial thrust on the spring.

HARRY G. SMITH.